United States Patent
Kalkowski et al.

(10) Patent No.: US 9,550,696 B2
(45) Date of Patent: Jan. 24, 2017

(54) METHOD OF PRODUCING LIGHTWEIGHT STRUCTURAL ELEMENTS

(75) Inventors: Gerhard Kalkowski, Jena (DE); Stefan Risse, Jena (DE); Ramona Eberhardt, Bucha (DE)

(73) Assignee: FRAUNHOFER GESELLSCHAFT ZUR FOERDERUNG DER ANGEWAANDTEN FORSCHUNG E.V., Munich (DE)

( * ) Notice: Subject to any disclaimer, the term of this patent is extended or adjusted under 35 U.S.C. 154(b) by 504 days.

(21) Appl. No.: 14/000,427

(22) PCT Filed: Feb. 9, 2012

(86) PCT No.: PCT/EP2012/052207
§ 371 (c)(1),
(2), (4) Date: Aug. 20, 2013

(87) PCT Pub. No.: WO2012/113651
PCT Pub. Date: Aug. 30, 2012

(65) Prior Publication Data
US 2013/0327093 A1    Dec. 12, 2013

(30) Foreign Application Priority Data
Feb. 22, 2011 (DE) .......... 10 2011 012 834

(51) Int. Cl.
*C03B 23/203* (2006.01)
*B32B 17/06* (2006.01)
(Continued)

(52) U.S. Cl.
CPC ............. *C03B 23/203* (2013.01); *B32B 3/266* (2013.01); *B32B 17/06* (2013.01); *C03B 23/20* (2013.01);
(Continued)

(58) Field of Classification Search
None
See application file for complete search history.

(56) References Cited

U.S. PATENT DOCUMENTS 3,754,812 A    8/1973    Mohn
4,466,700 A    8/1984    Christiansen et al.
(Continued)

FOREIGN PATENT DOCUMENTS

| DE | 3018785 A1 | 11/1981 |
| DE | 102007060784 A1 | 6/2009 |
| DE | 102009011863 A1 | 9/2010 |

OTHER PUBLICATIONS

Megel et al., "CFY-Stack: from electrolyte supported cells to high efficiency SOFC stacks", Cell & Stack Operation, Chapter 10, A1203 ,Jun. 26-29, 2012.
(Continued)

*Primary Examiner* — Barbara J Musser
(74) *Attorney, Agent, or Firm* — Jacobson Holman, PLLC.

(57) ABSTRACT

The invention relates to a method of producing lightweight structural elements which are produced as a composition construction element having at least one cover plate and one carrier element which are connected to one another. A carrier element, at which at least one apertures and/or at least one cut-out is/are formed and at least one further element, which is a cover plate, are connected to one another. A carrier element and at least one cover plate can be formed from a glass, a glass ceramic material, a ceramic material and/or silicon having an oxide surface layer which is formed at least in the bonding region of the elements to be connected to one another. The carrier element should have at least a double thickness with respect to the thickness of a cover plate. The surfaces of the cover plate(s) and of the carrier element to be connected to one another should be intensely cleaned in their
(Continued)

Figure 1:
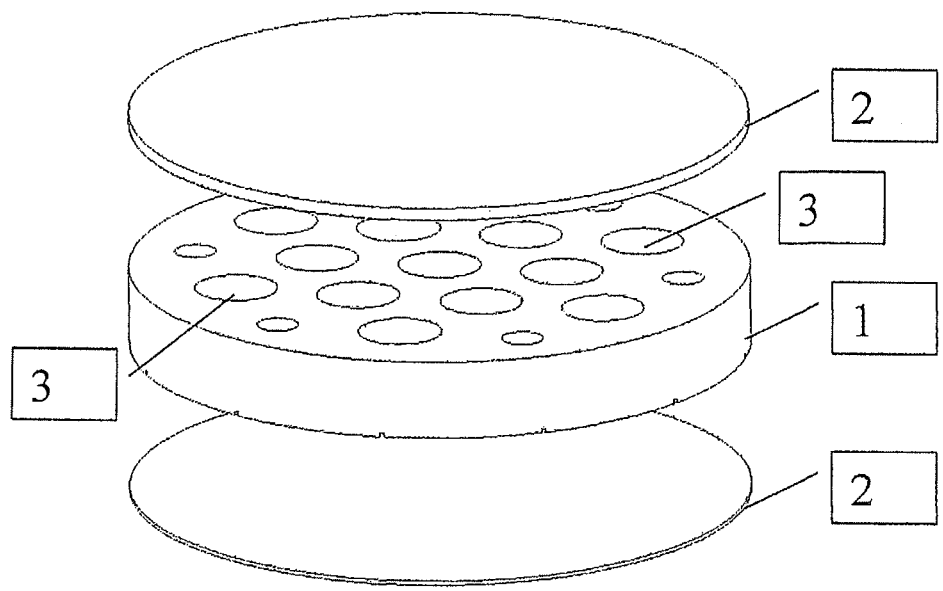

bonding regions and should be smoothed such that a roughness of the surface is achieved there, such that they are in direct touching contact with at least 80% of their bonding surface with an active compression source and in this respect a thermal treatment is carried out at a temperature of at least 100° C. and maintaining of the temperature over a period of at least 0.5 h to establish a bond connection of the cover plate(s) and the carrier element. In this respect, at least one cover plate should be connected to a surface of the carrier element at which at least one opening of an aperture or of a cut-out is arranged.

14 Claims, 7 Drawing Sheets

(51) Int. Cl.
  *C03B 23/20* (2006.01)
  *C04B 37/00* (2006.01)
  *C04B 37/04* (2006.01)
  *G02B 5/18* (2006.01)
  *G02B 7/183* (2006.01)
  *B32B 3/26* (2006.01)

(52) U.S. Cl.
  CPC ............. *C04B 37/001* (2013.01); *C04B 37/04* (2013.01); *G02B 5/1847* (2013.01); *G02B 7/183* (2013.01); *C04B 2237/34* (2013.01); *C04B 2237/343* (2013.01); *C04B 2237/365* (2013.01); *C04B 2237/366* (2013.01); *C04B 2237/52* (2013.01); *C04B 2237/62* (2013.01)

(56) References Cited

U.S. PATENT DOCUMENTS

| | | |
|---|---|---|
| 5,076,700 A | 12/1991 | DeCaprio |
| 6,045,231 A | 4/2000 | Martineau |
| 2003/0211705 A1* | 11/2003 | Tong .................. H01L 21/0206 438/455 |
| 2006/0240640 A1* | 10/2006 | Nesterenko .......... B23K 20/021 438/455 |
| 2010/0226030 A1 | 9/2010 | Baldus et al. |
| 2010/0288422 A1 | 11/2010 | Krauss et al. |
| 2012/0295074 A1* | 11/2012 | Yi .......................... B82Y 30/00 428/195.1 |

OTHER PUBLICATIONS

Christiansen et al.; "Wafer Direct Bonding: From Advanced Substrate Engineering to Future Applications in Micro/Nanoelectronics", IEEE, vol. 94, No. 12, pp. 2060-2106, Dec. 2006.
Pelissier et al.; "Fabrication of Buried Corrugated Waveguides by Wafer Direct Bonding", J. of Lightwave Technology, IEEE, vol. 18, No. 4, Apr. 1, 2000.
Augendre et al.; "Direct Bonding for Silicon Photonics", Photontonics Global Conference, IEEE, Dec. 14, 2010, pp. 1-5.
Suni et al.; "Effects of Plasma Activation on Hydrophilic Bonding of Si and SiO2"; J. Electrochemical Society, vol. 149, No. 6, Jun. 1, 2002; pp. G348-G351.
Li et al.; "Systematic Low Temperature Silison Bonding Using Pressure and Temperature"; J. Appl. Phys. 5, vol. 37, No. 3A (Mar. 15, 1998) pp. 737-741.
Dragoi et al.; "Wafer-level Plasma Activated Bonding: New Technology MEMS Fabrication"; Microsys. Technol., vol. 14, No. 4-5, Oct. 20, 2007, pp. 509-515.
Zhen et al.; "Single Crystal Si Layers on Glass Fabricated by Hydrophilic Fusion Bonding & Smart-Cut Technology"; Chin. Phys. Lett., vol. 21, No. 12, Dec. 1, 2004, pp. 2540-2542.
Sayah et al.; "A Novel Low-Temperature Pressure Assisted Bonding Technology"; Proceedings of SPIE, vol. 4175, Sep. 18, 2000, pp. 363-370.
Ando et al.; "Glass Direct Bonding Technology for Hermetic Seal Package"; Proceedings/MEMS 97; IEEE Service Center, Jan. 26, 1997, pp. 186-190.

* cited by examiner

METHOD OF PRODUCING LIGHTWEIGHT STRUCTURAL ELEMENTS

This is a national stage of PCT/EP12/052207 filed Feb. 9, 2012 and published in German, which has a priority of German no. 10 2011 012 834.4 filed Feb. 22, 2011, hereby incorporated by reference.

The invention relates to a method of producing lightweight structural elements which are produced as a composition construction element having at least one cover plate and one carrier element which are connected to one another. The lightweight structural elements produced in accordance with the invention can advantageously be used for precision-mechanical, optical applications or as electrostatic holding elements. The individual elements of the lightweight structural elements in accordance with the invention in this respect comprise a glass, preferably also ULE glass, having very small thermal coefficients of expansion, a ceramic material or a glass ceramic material. They are preferably optically transparent, i.e. transparent for a larger wavelength spectrum of visible light.

The demands of a small mass have to be brought in line with high mechanical strength and stiffness. In addition, strains which occur as a result of alternating thermal load have to be able to be coped with.

The pressure conditions present in space must in particular also be able to be taken into account for a use of lightweight structural elements produced in accordance with the invention in space.

As a rule, monolithic carriers are used for the lightweight structural elements in question in which monolithic carriers bores or cut-outs are formed to reduce the mass. They can be arranged, dimensions and aligned such that they can form a stable support structure. To increase the stability, strength and stiffness, it is customary to use such carriers with plate-like elements with which openings of apertures or cut-outs can be closed and thereby the stability of such a lightweight structural element can also be increased.

Carriers and one or more plate-shaped elements are connected to one another with material continuity for this purpose. Since solder connections are frequently excluded due to the temperature sensitivity and since they are not optically transparent, a composite was produced using suitable adhesives. However, they have substantial disadvantages. They increase the bond gap, change the optical properties by forming boundary surfaces, creep under mechanical strain, have different thermal expansions, are hygroscopic and tend to degas at elevated temperatures and/or in vacuum and become brittle at low temperatures.

It was therefore proposed in DE 10 2009 011 863 A1 to produce a lightweight carrier structure using a method which is called anodic bonding. The bond connection of two components is in this respect produced at higher temperatures of around 400° C. At the same time, an electrical field is formed, whereby an ion transport takes place in the glass from which the parts to be connected are produced which results in the forming of the bond connection. Movable ions, in particular $Na^+$ or $Li^+$ are required in the glass for this purpose. The use on correspondingly suitable glass types in which such ions are contained is thereby restricted. A bonding of pure fused silica, which has very good properties from an optical aspect, is therefore not possible in this form. This also applies to glasses having extremely small thermal coefficients of expansion which are, however, preferred for many applications and which are known, for example, as ultra-low expansion (ULE) glass.

With substances or materials which can be polarized in electrical fields, unwanted changes of their properties can be caused. In addition, the formation of the required electrical fields increases the effort and/or expense.

In the production of lightweight mirrors such as is described in DE 30 18 785 A1, a sintering of glass should be used for a bond connection. Very high temperatures are required for this purpose and a shrinkage on sintering has to be taken into account. In addition, an impairment of the optical properties cannot be avoided.

It is therefore the object of the invention to provide possibilities for an inexpensive manufacture of lightweight structural elements with which an improved bonding connection can be durably produced and in which optionally required optical properties are not impaired or only slightly impaired by the bonding process.

In accordance with the invention, this object is achieved by a method having the features of claim 1. Advantageous embodiments and further developments of the invention can be realized using features designated in subordinate claims.

In the production of lightweight structural elements as a composite components, at least two elements are connected to one another, with one element being a carrier element at which the at least one aperture and/or at least one cut-out is formed, and at least one further element which is a cover plate.

In this respect, a carrier element and at least one cover plate are used which are formed from a glass, a glass ceramic materials, a ceramic material and/or silicon having an oxide surface layer which is formed at least in the bonding region of the elements to be connected to one another.

The carrier element should have at least a double thickness with respect to the thickness of a cover plate.

In preparation for the production of the bond connection, the surfaces of the cover plate(s) and of the carrier element to be connected to one another are smoothed and polished in their bonding regions so that a very high planarity and a very small roughness of the bonding surface is achieved so that they are in direct touching contact with at least 80% of their bonding surfaces at an acting compression force.

An intense cleaning, optionally with plasma assistance should be carried out to form hydrophilic surfaces, should be carried out, which will be looked at in more detail in the following.

With an active compression force which the carrier element and the cover plate(s) are pressed together, a thermal treatment is carried out at a temperature of at least 100° C. and at a maximum of 600° C., preferably under vacuum conditions. This temperature is maintained over a time period of at least 0.5 h. In this respect, a bonding connection of the cover plates with the carrier element is established without an additional material being required. Compression forces of at least 2 kPa up to a maximum of 5 MPa should be active.

In this respect, at least one cover plates is connected to a surface of the carrier element at which the at least one opening of an aperture or of a cut-out is arranged.

Apertures can preferably be guided through the carrier element from a side at which a cover plate has been connected up to the oppositely disposed side through the whole carrier element. Cut-outs can be formed as blind bores or in the form of channels. The production can take place by drilling or cutting in a short time and with small effort and/or cost. After such a treatment has been carried out which has been performed for forming apertures and/or cut-outs, damage or material impairments, in particular in glass and at margins, due to subsequent faceting and/or etching with HF acids are carefully removed.

The levelness or planarity of polished surfaces can preferably be determined interferometrically. The peak-to-valley value (PV) determines the distance between a highest point and a lowest point of a surface when this surface has been approximated by a compensation plane.

The planarity in the invention should comprise better than 1 μm PV over a surface having a diameter of 100 mm for solid glass substrates having a thickness >5 mm.

The planarity in the invention should comprise better than 10 μm PV over a surface having a diameter of 100 mm for thinner glass substrates having a thickness <5 mm; and the planarity in the invention should comprise better than 40 μm PV over a surface having a diameter of 100 mm for solid glass substrates having a thickness <1 mm.

The planarity should preferably, however, be better than the indicated limit values by at least a factor of 10.

With larger elements to be bonded, this should be satisfied over any desired selected surface section having a diameter of 100 mm.

With smaller surfaces/elements, this should be scaled proportionally to the diameter. For example, with a round blank having a diameter of 25 mm, a thickness of 10 mm, the planarity should thus be at least 1 μm*25 mm/100 mm=250 mm, preferably better than 25 mm.

The roughness of the surfaces can be determined using an AFM (atomic force microscope). The root mean square (RMS) designates the roughness value (root from the mean value of the quadratic deviation of the heights with respect to a compensation plane) over a surface which typically has a size of 1 μm*1 μm, optionally also ˆ10 μm*10 μm.

In the invention, a limit value of a maximum of 3 nm RMS should be observed. This value should preferably be better than this limit value by a factor of 5.

The required planarity of the bonding surfaces with planar bodies or the permitted deviation from a desired radius with spherically curved surfaces, which are to be connected to one another, therefore depends on the thickness of the respective element. As a rule of thumb, it can be stated that with a smaller thickness these demands are smaller since the flexible deformability is then larger before a break occurs. The required planarity can be increased, alone or additionally thereto, as the thickness of the respective cover plate increases or the permitted deviation of the surface from a desired radius of a cover plate can be reduced as the thickness of the respective cover plate decreases.

With spherical bonding surfaces, the two surfaces to be connected to one another should coincide with one another in a correspondingly good manner. The maximum gap on the contact should not be later than the corresponding value for level, planar bonding surfaces having the same extent (area) and wall thickness (thickness).

Different processes can be used for the smoothing/leveling such as are already used in the production of micromechanical elements, in particular of such optical elements. In additional to simple polishing and/or lapping using suitable lapping or polishing means, a chemical mechanical polishing (CMP) can also be used such as is customary in the production of semiconductor components.

The bonding should preferably be carried out at a temperature of at least 200° C., preferably of around 250° C. In this respect, a compression force in the range 2 kPa to 5000 kPa, in particular in the range 1000 kPa to 2000 kPa, can be exerted on the elements to be bonded to one another in the bonding. During the heating phase of the heat treatment, compression forces which lie at 50% of the named compression forces should be exerted up to the reaching of the maximum bonding temperature. After reaching the maximum temperature, the pressure can then be increased to the maximum compression force values. The thermal treatment for bonding the cover plate(s) to the carrier element or also to further elements should preferably be carried out under vacuum conditions or in an inter atmosphere.

The elements of a lightweight structural element which are to be connected to one another can be produced from a material which is selected from silicon dioxide (silica glass), another glass or a glass ceramic material, in particular having a thermal coefficient of expansion $<1*10^{-7}$/K at room temperature, a ceramic material which is selected from $Al_2O_3$/sapphire, AlN, SiC, yttrium aluminum garnet ($Y_3Al_2O_{12}$, yttrium vanadate $YVO_4$, other garnets and vanadates which can in particular also be dosed with rather earth for laser applications or non-linear optical crystals ($LiB_3O_5$, $LiNbO_3$, $KTiOPO_4$ potassium titanyl phosphate). In this respect, the elements can each comprise the same material. If different materials are used for the elements to be bonded, the deviations of the thermal coefficients of expansion should be kept so small and the bonding temperature so low that no break can arise on cooling to room temperature.

The elements to be bonded must have a very high cleanliness in addition to the described geometrical requirements (very high planarity and coincidence of shape and extremely low roughness).

The cleaning of surface regions of the elements to be connected to one another should first take place with organic solvents and then with distilled water or deionized water in conjunction with chemical additives and sonic assistance. In this respect, sound waves in the megahertz frequency range should be used. Subsequent to the cleaning with water, a plasma treatment can be carried out which is carried out using oxygen, nitrogen and an inert gas or a gas mixture thereof. Nitrogen is preferred in this respect.

In the cleaning, use can be made of the processes and standards known from semiconductor technology, for example under the umbrella term RCA cleaning (Standard Clean 1). In particular aqueous alkaline solutions ($N_4OH$) and hydrogen peroxide solutions ($H_2O_2$) can be used for such a cleaning. They can be used alternately in the cleaning. The cleaning can in this respect be carried out in a dipping process or with a liquid jet on a rotary table.

All contaminants, that is polish residues, organic residues, metallic and inorganic contaminants, should be removed by the cleaning.

This cleaning condition may not yet be sufficient for direct joining/bonding at the indicated temperatures <600° C. because the surfaces themselves can be contaminated again very fast (invisibly) even with a storage in a protected environment by very small aerosols/particles, organic vapors from the environmental air (e.g. solvents or degasing plastic packages, etc.). Even monolayers of hydrocarbons can be harmful.

A further fine cleaning and activation of the bonding surfaces should therefore be carried out directly (a maximum of 3 h, better less than 1 h) before the bonding process in a clean room environment of high quality (ISO 4 or better).

In this respect, an aqueous, chemically assisted cleaning of the bonding surfaces is first carried out based on the known RCA process for Si wafers in the semiconductor industry. In this respect, (alkaline) $NH_4OH$ solutions (ammonia, approx. 2-4% by mass in DI water) should be used alternately with $HO_2$ solutions (hydrogen peroxide, approx. 2-4% by mass in DI water).

These solutions are preferably alternately (approx. 2 minutes in each case) rinsed as a jet over the bonding surfaces while the parts to be cleaned rotate on a rotary table (approx. 300-2000 revolutions/min) to spin dissolved particles/substances immediately away to the outside by centrifugal force.

A rinsing process then takes place with distilled or at least deionized (DI) water, where possible likewise while rotating and where possible with sonic assistance in the megahertz range (megasonic cleaning).

The elements to be bonded are subsequently spun dry or blown dry with nitrogen of the highest purity.

The total process can optionally be repeated several times. The effect of the chemical solutions on the glass surfaces can also already take place with megasonic assistance.

After the fine cleaning, a plasma activation of the bonding surfaces takes place in $N_2$, $O_2$ plasma, or also in noble gas plasma (e.g. argon or even hydrogen/noble as mixture), with $N_2$ plasma being preferred. A treatment in low-pressure plasma (at pressures between around 0.01 mbar and 100 mbar, preferably around 0.3 mbar, is preferred. A treatment at normal pressure (around 1 atm) is, however, also possible.

A plasma treatment can be carried out in vacuum at the named pressures over a time period between 10 s and 300 s, preferably 60 s. The required electrical alternating field should have a power between 0.1 $W/cm^2$ to 10 $W/cm^2$, preferably approx. 1 $W/cm^2$, of the surface to be cleaned.

Directly after the plasma treatment, a rinsing process should again be carried out with pure water and sonic assistance, preferably in the megahertz range, to achieve a hydrophilic surface saturated with OH groups in the bonding surface regions. The respective element to be cleaned can in this respect likewise be arranged on a rotary table and rotate as on the cleaning. Immediately after a drying, preferably by spinning (rotation a high number of revolutions), the elements to be connected to one another should be placed onto one another and the bond connection should then be established.

A possible combination with solid particles or gaseous compounds at the surface regions to be bonded is thereby avoided.

For the bonding, the dried elements are brought into close mechanical contact by suitable pressing in the region of the bonding surfaces. This can generally take place at air or in vacuum. A vacuum (low pressure) of <10 mbar, particularly preferably $<10^{-3}$ mbar, is preferred.

In the pressed state, the composite is evenly heated (heating rate approx. 5-10 k/min) and is held at a temperature in the range from around 100° C. to 600° C., preferably around 250° C. The duration of the heat treatment can be reduced as the holding temperature increases. It should amount to around ½ hour to 24 hours, preferably around 4 hours, for a holding temperature of 250° C. In the thermal treatment for bonding, the temperature should be evenly increased up to a maximum temperature and in so doing lower compression forces should already be exerted than is the case on reaching the maximum bonding temperature.

The pressing force with which the elements to be bonded are pressed against one another at elevated temperatures, in particular with elements composed of a glass, should amount to approx. between 2 kPa and 2 MPa, but to a maximum of 5 MPa, to avoid the risk of strains/distortions in the elements to be bonded or even damage or at least to keep them in tolerable limits.

The pressing force should be sufficiently high to bring the elements to be bonded into close mechanical contact over their total bonding surface. With perfectly planar surfaces, this requires a very low pressure, under certain circumstances the mass of the element lying on may be sufficient under vacuum conditions.

With thin cover plates (glass wafers), the planarity is usually restricted by the elasticity of the elements for production reasons. A planar state is admittedly first produced during the dual-side lapping and polishing, deflections can appear afterward due to internal strains.

The result is frequently a wavy surface which, however, can be cling to a planar counter-surface (perforated plate) under sufficient pressure.

A bending load on the glass plates which exceeds the (particularly critical) tensile strength of the material is to be avoided. It can be necessary for this purpose to achieve a uniform (areal) compression force distribution over the elements to be bonded by resilient (elastic) layers between elements to be bonded and plungers without local excesses of the bending strain occurring in the elements due to shape deviations with respect to the plungers.

These layers can e.g. be resilient/soft films made from expanded graphite or possibly also from temperature-resistant plastic (PTFE).

After the end of the holding time at a maximum temperature for bonding, the pressing pressure should be cancelled (or at least greatly reduced) and the temperature should again slowly be lowered to room temperature.

The handling of the elements (from cleaning and plasma activation up to the placing on one another) should take place such that the bonding surfaces cannot touched or otherwise contaminated in the meantime.

Elements can be bonded successively using the method in accordance with the invention and lightweight structural elements can also be produced in which at least two carrier elements having at least one cover plate, but then preferably two cover plates, are joined.

There is moreover the possibility of connecting at least one cover plate having an optically active surface structure to the carrier element. An optical element having at least one cover plate can be connected alone or in addition thereto.

In this respect, the structuring of the surface can take place such that regions are present which are arched concavely or convexly. These regions can be arranged so that they are arranged at apertures in the carrier element so that electromagnetic radiation can be conducted through the cover plate(s) and the apertures of the carrier element. A focusing or collimation of the radiation can be achieved using such structures. At least one Fresnel structure can also be present.

Further optical elements can also be fixed to cover plates. This can be achieved by an analog method for the production of the composite by bonding, such as has already been described for the connection between the cover plate(s) and the carrier plate. For example, at least one optical prism can thus be fixed at a cover plate at a surface which is disposed opposite the surface at which the respective cover plate has been connected to the carrier element.

At least one surface of the carrier element and the surface of the cover plate, which is to be connected to this surface, cannot only be smooth and planar, but also spherically curved. In this respect, one surface is concavely curved and the respective other surface is convexly curved. On the compression force exertion for bonding, it is possible to work with suitable tools which likewise have correspondingly curved surfaces. An elastically deformable element, e.g. a mat of PTFE or a film of expanded graphite (GL Group, Carbon SE, Wiesbaden), can be inserted between a plunger with which the compression force can be exerted and a cover plate.

An optical grid can be produced using straight-line cut-outs which are formed in the carrier element and/or in a cover plate. The cut-outs arranged in parallel with one another and at a predefinable distance from one another can preferably be formed in a surface of a cover player and/or in the carrier element which surface preferably faces the interior of the lightweight structural element.

If a lightweight structural element produced in accordance with the invention is to be used for optical applications, the optically transparent elements connected to one another and accordingly the total radiation penetrated lightweight structural element should have a transmission of at least 60% at at least a wavelength within the wavelength range between 110 nm and 11 μm, preferably in the wavelength range of visible light, and in this respect the transmission should be reduced with the established bonding connection(s) by a maximum of 5%, preferably a maximum of 2%, with respect to the sum of the individual elements.

Other elements can also be produced with the invention beside optically active lightweight structural elements. For example, a surface of a first cover plate can be provided with a thin electrically conducting coating for the production of electrostatic holding elements. This can be done in structured form by the application of lithographical technology or by means of masks. Surfaces which represent bonding regions with the carrier element can accordingly be provided with thin films suitable for bonding such as $SiO_2$, $Al_2O_3$ having a layer thickness of approx. 1 nm to 100 nm. The coatings can be formed with known CVD processes or PVD processes. A 50 nm thick metallic Cr layer can thus, for example, be formed by sputtering and then a 30 nm thick $Al_2O_3$ layer can then be formed thereon by sputtering. The electrically conductive compound can be produced laterally at the margin or through the carrier element and a contacting can be achieved.

An electrically conductive metal layer can also be prepared for the bonding of a dielectric by the described process by an oxidation of the surface.

A dielectric element can then be fixed on the surface of a first cover plate disposed opposite the carrier element by a direct bonding which can be carried out analogously to be able to match the electrostatic effect and the strength. Its outwardly facing surface can likewise be structured such as is already known with electrostatic holding elements.

Analogously, a carrier element and a cover plate of oxidized silicon which is at least slightly electrically conductive, as already described, can be connected, for example. A plate-like element of a glass, e.g. Pyrex 7740 such as is commercially available from the Corning company, and which has a similar thermal coefficient of expansion, such as silicon, can then be fastened to the cover plate. In this case, the bonding composite can also be produced as described above.

The production of an electrostatic holding element can, however, also take place such that a plate-like element of a glass or of an electrically conductive ceramic material provided with an electrically conductive coating can first be connected to one another with a further dielectric plate-like element in the previously described form. This composite can then subsequently be connected in an analog manner to a carrier element.

If silicon is used, a slight oxidation should take place at the corresponding surface before the actual bonding as a precondition for an ideal direct bonding. The oxide layer can be a few nanometers thick. It can be opened and/or removed easily by etching, which is favorable for the production of the electrically conductive connection to an electric voltage source.

The bond connection can be established without additives or electrical fields. Since no additives have to be used in bonding regions and/or since no substantial changes of the material result there, this is favorable for transmissive optical applications since no additional boundary surfaces and/or changes in the refractive index occur.

All apertures and/or cut-outs should advantageously be connected to one another such that a pressure compensation is made possible in the bonded state of the lightweight structural element.

At least one surface can be provided with a reflective coating or at least one cover plate can be completely or partially reflective for electromagnetic radiation. A optical mirror, a beam splitter, can thus be provided for optical applications. A use of lightweight structural elements produced in accordance with the invention can take place for optical precision structures in laser applications, e.g. laser resonators, as an optical bench, or for optical components in space.

The invention will be explained in more detail by way of example in the following.

Figure 2:
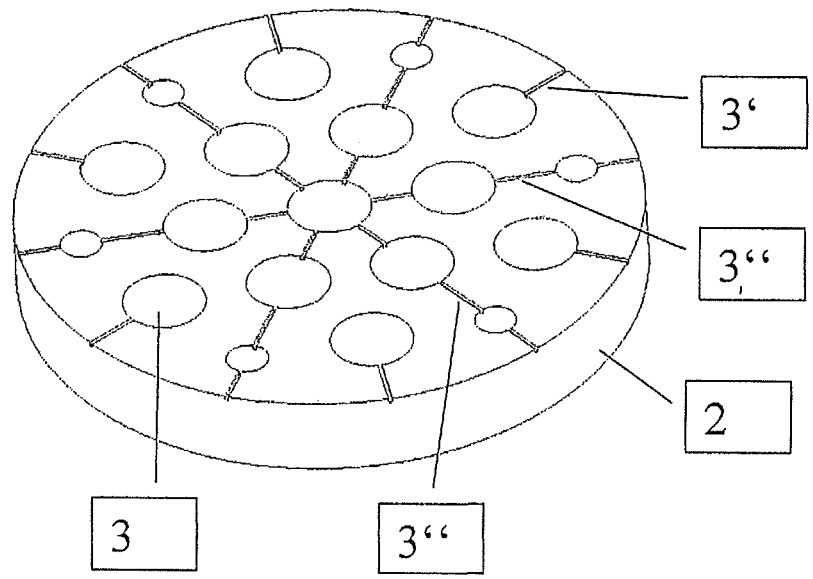
Figure 3:
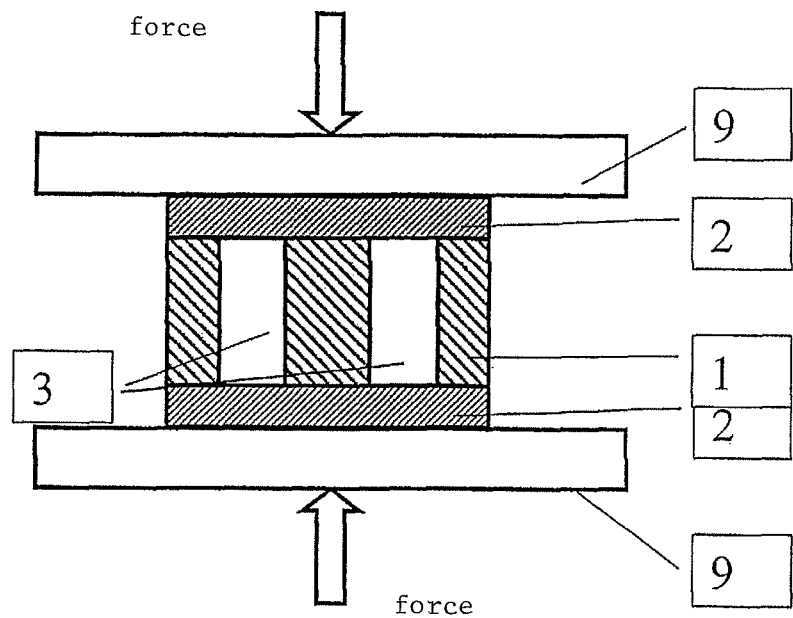
Figure 4:
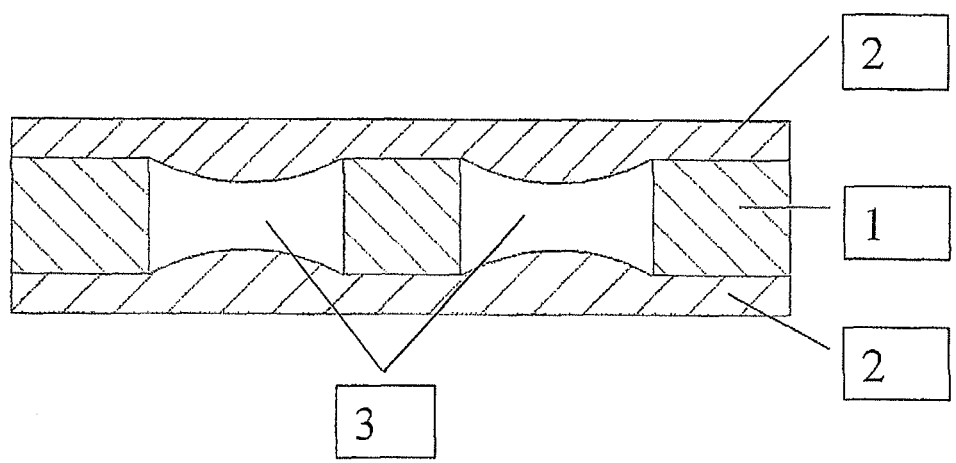
Figure 5:
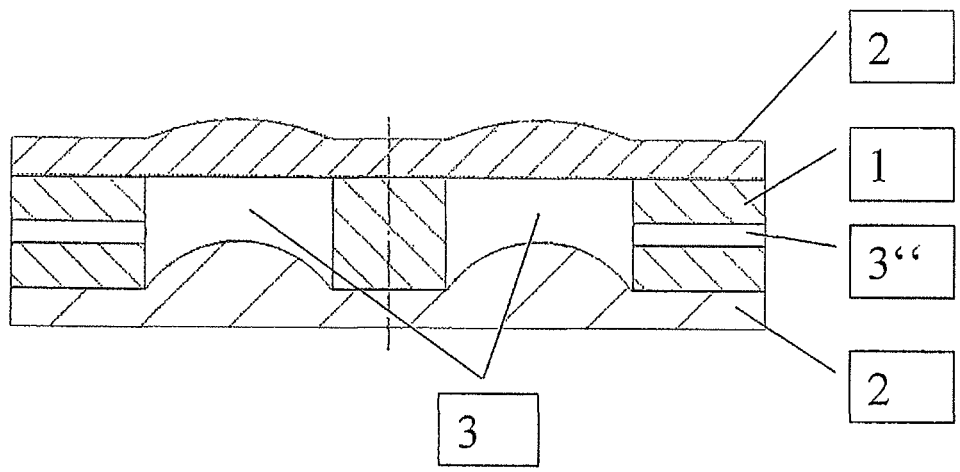
Figure 6:
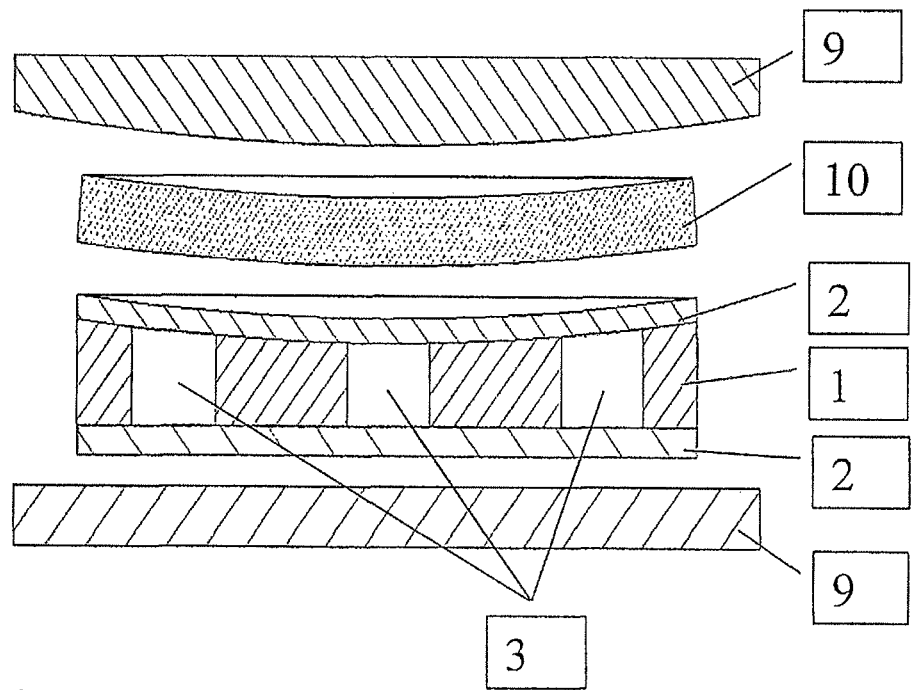
Figure 7:
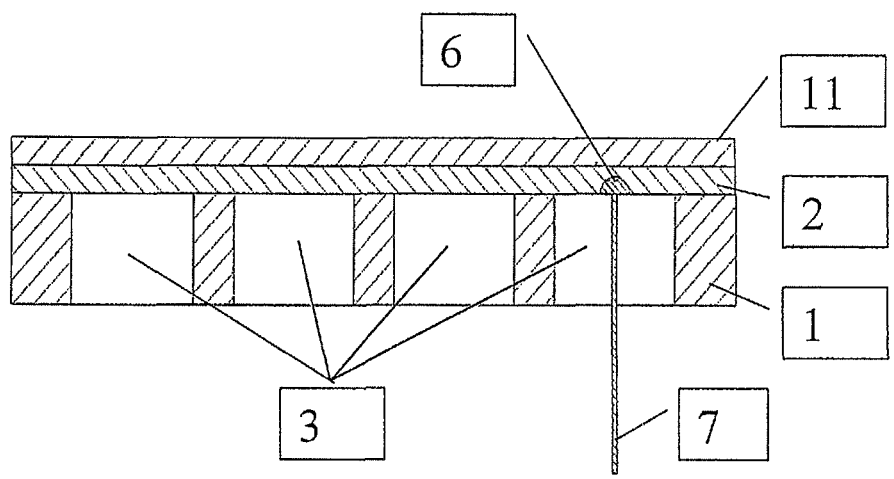
Figure 8A:
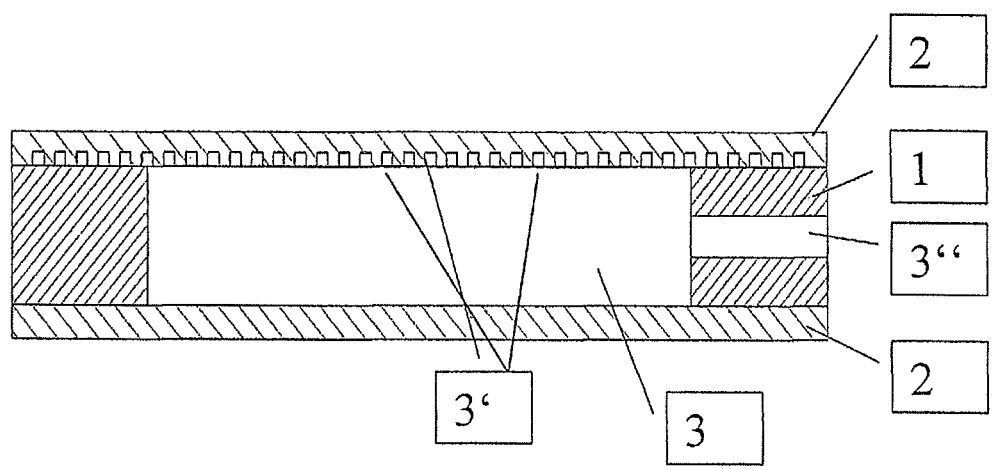
Figure 8B:
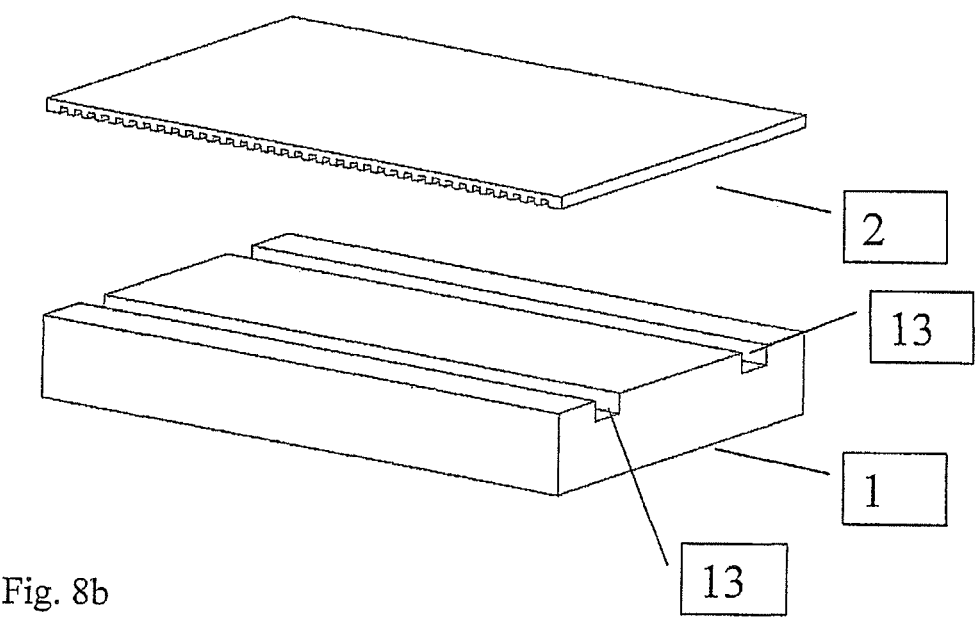
Figure 8C:
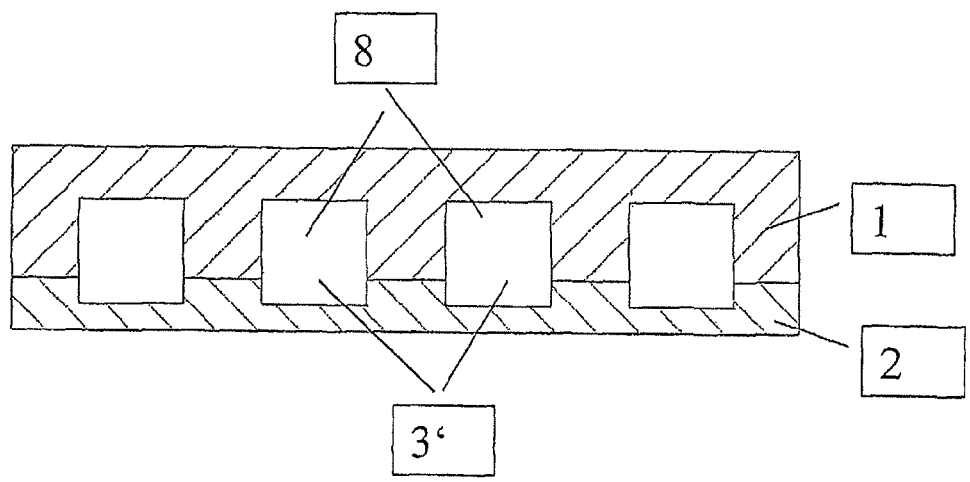
Figure 9:
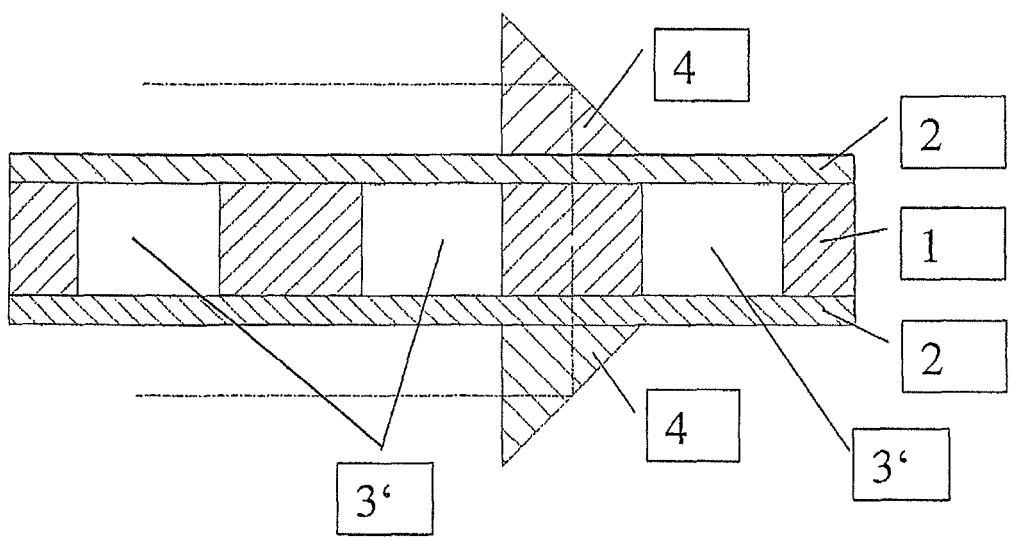

There are shown:

FIG. 1 in a perspective explosion representation, two cover plates and a carrier element which are to be bonded to form a lightweight structural element;

FIG. 2 a perspective representation of an example of a carrier element;

FIG. 3 a structure for bonding a lightweight structural element;

FIG. 4 a lightweight structural element having structured cover plate surfaces;

FIG. 5 a further example of a lightweight structural element having structured cover plates surfaces;

FIG. 6 an example of a lightweight structural element having a spherically arched surface;

FIG. 7 in schematic form, an electrostatic holding element as an embodiment of a lightweight structural element;

FIG. 8*a* in a sectional representation, an example for a lightweight structural element produced in accordance with the invention with a unilaterally periodic grid structure at a cover plate;

FIG. 8*b* a further example with a fine grid structure for diffractive applications;

FIG. 8*c* a further example with a coarse grid structure for mechanical applications; and FIG. 9 in a section representation, an example for a lightweight structural element produced in accordance with the invention with additional optical elements for beam guidance/deflection.

Two cover plates 2 which are to be connected with a carrier element 1 are shown in an exploded representation in FIG. 1. Bores, as apertures 3, are led through the carrier element 1 from one end face to the oppositely disposed end face. The intermediate spaces between the apertures 3 form bonding regions at these end faces. The dimensioning of the apertures 3, their number and their arrangement can be selected in accordance with the desired mechanical strength and stiffness and can, for example, be calculated in advance.

The surfaces of the carrier element 1 used for bonding and the two cover plates 2 are level and planar in this example. The shown rotationally symmetrical shape of the cover plates 2 and of the carrier element 1 is not necessarily required, but provides favorable conditions for the production and use.

As can be seen from the representation, the thickness of the carrier element 1 is substantially larger than the thickness of the cover plates 2. The cover plates 2 do not have to of equal thickness. They increase the mechanical strength and stiffness of the lightweight structural elements produced in this way after the bonding surface in accordance with the invention.

It becomes clear from the representation of FIG. 2 that the apertures 3 in the carrier element 1 can be connected to one another and additionally to the environment by means of further channels 3". The channels 3" can be bores led transversely/perpendicular to the apertures 3 through the carrier element 1, said bores being formed in star shape here.

The production of the lightweight structural element should be illustrated by FIG. 3. In this respect, a cover plate 2 is first bonded with the carrier element 1 at oppositely disposed end faces. The cover plates 2 and the carrier element 1 are manufactured from fused silica and produced with good optical properties. There is the possibility of first only connecting the first cover plate 2 to the carrier element 1 and then later to connect this composite to the second cover plate 2. The cleaning and activation of the surfaces of the carrier element 1 to be bonded can thereby in each case be restricted to one side.

The cover plates 2 have a thickness of 1 mm and the carrier element 1 has a thickness of 10 mm. They have a diameter of 100 mm. Passage bores are formed as apertures 3 in the carrier element 1.

The end faces of the carrier element 1 used for bonding were smoothed inter alia by lapping and polishing so that a planarity of the end faces of smaller than 1 µm and a roughness of 0.8 mm RMS were able to be reached. With the thinner cover plates 2, a planarity of 20 µm is sufficient as the maximum distance between the minimal and maximum value of the surface profile (peak to valley) over a length of 100 mm.

The apertures 3 can be obtained by drilling, which is possible without problem due to the relatively low thickness of the carrier element 1. The margins or the burr formed can be reworked simply by chamfering the edges and optionally etching with hydrofluoric acid.

Subsequent to the mechanical processing, an immediate cleaning is carried out using acetone and isopropanol as well as subsequently with $NH_4OH$ and $H_2O_2$ corresponding to the known RCA process. The parts (cover plates 2 and carrier element 1) precleaned in this manner are brought into a clean room environment of ISO Class 3 for bonding and a fine cleaning is carried out there on a rotary table in that alternately 2% solutions of $NH_4OH$ and $H_2O_2$ are rinsed over the rotating bonding surfaces. Rinsing then takes place with distilled water and simultaneously a sound wave coupling in the megahertz range is carried out. The surfaces are spun dry and subsequently to this, at a pressure of 0.3 mbar over a period of 60 s, a plasma treatment is carried out with nitrogen as the plasma gas at a power of 1 $W/cm^2$ per surface. Directly subsequently to this, a rinsing is carried out with distilled water with a simultaneous sound wave coupling in the megahertz range. Directly subsequently to a drying, the bonding surfaces of the elements to be connected to one another (carrier element 1 and cover plates 2) are placed on one another in an adjusted manner and are brought into touching contact.

The two pars lying on one another (cover plate 2 and the carrier element 1) are arranged between two pressing stamps 9 in a mutually adjusted state and a compression force of 100 kPa is applied to them, as is indicated by the arrows. In this respect, the environmental pressure is reduced to $10^{-3}$ mbar and a heating to a temperature of 250° C. is carried out.

At this temperature, the compression force with which the two parts are pressed together is increased to 1 MPa. The compression force and the temperature are maintained for 4 h. The compression force effect can then be cancelled, cooling can take place slowly and the environmental pressure can again be increased to a normal pressure level. The bond connection between the two cover plates 2 and the carrier element 1 is then established with sufficient strength.

Examples of lightweight structural elements in accordance with the invention are shown in FIGS. 4 and 5 in which cover plates 2 having regionally structured surfaces have been connected to the carrier element 1. The structural elements at the cover plates 2 are spherically arched so that they form optical lenses. They face into the interior of the lightweight structural elements in the two examples shown and are arranged in the region of apertures 3. Influence can be taken on the radiation conducted through the lightweight structural element by the respective arrangement and spherical curvature since the radiation's refraction at the boundary surfaces can be utilized accordingly.

In FIG. 5 additional channels 3" are shown with which the hollow spaces formed by the apertures 3 for a pressure compensation can be brought into communication with the environment.

The exploded representation of FIG. 6 shows a lightweight structural element in which an end face of a carrier element 1 and a cover plate 2 can be spherically arched. The spherical arching takes place in accordance with a desired radius. In the production, an elastic mat 10 of PTFE can be placed between the pressing stamps 9. In this example, the mat 10 is only arranged between a pressing stamp 9 and the spherical cover plate 2. Such a mater 10 can also, however, be used at both sides.

An elastic mat 10 should also be used in the bonding of the example of FIG. 5 to be able to distribute the compression forces evenly over the surface to be bonded.

Reference is made with respect to the establishing of the bond connection to the procedure such as has been described for the examples of FIGS. 1 to 3.

FIG. 7 shows an electrostatic holding element which can be manufactured using the invention. In this respect, the top plate 2 and a carrier element 1 of silicon are directly connected to one another. At least the bonding regions of the cover plate 2 and of the carrier element 1, in which apertures 3 are formed, are oxidized so that a thin silicon oxide layer is formed at the surface there before the bonding is carried out. In this respect, work is carried out at a compression force to the amount of 1000 Pa. The heat treatment is carried out at a temperature of 300° C. over a period of 2 h.

The cover plate 2 can be connected before or the bonding to the carrier element 1 to a plate-like element 11 of glass having a thermal coefficient of expansion which at least approximately corresponds to that of silicon. The bonding can in this respect be carried out as explained above.

The oxide layer of the cover plate 2 can subsequently be removed in a suitable form at at least one position around a rear terminal contact 6 which can be connected with an electrical conductor 7 to an electrical voltage source (not shown). The removal of the oxide layer can be achieved simply mechanically or chemically by etching.

In FIGS. 8a to 8c, examples of lightweight structural elements are shown which can be produced using the invention and which are suitable for mechanical platforms or also for diffractive optical applications.

An example is shown in FIG. 8a in which a periodic grid structure is formed at a surface of a cover plate 2 facing into the interior. Said grid structure can be achieved with correspondingly arranged and aligned cut-outs 3'. The grid structures can, however, also be formed with other means at a cover plate 2, for example by structured coating.

It is shown in FIG. 8b how the mass can be reduced using channel-like straight cut-outs 11 in the carrier element 1.

In the example shown in FIG. 8c, cut-outs 3' are formed at a cover plate 2 and also cut-outs 8 correspondingly complementary thereto at the carrier element 1. The cut-outs 3' and 8 are in this respect arranged in parallel with one another and periodic.

FIG. 9 shows a lightweight structural element such as can likewise be produced using the invention.

In this respect, two optical prisms are as additional optical elements 4 are connected to two cover plates 2 of a lightweight structural element as has already been described for FIGS. 1 to 3.

The optical prism 4 can be connected to cover plates exactly in the manner as has already been explained for the production of the composite between the cover plate(s) 2 with the carrier element 1.

The beam guidance of electromagnetic radiation which can be achieved with such a lightweight structural element can be followed by the chain-dotted line. As shown, a reversal in direction of 360° can be reached. At least one optical prism 4 can also be configured as a beam splitter. For this purpose, a surface can be provided with a coating suitable for this purpose.

The invention claimed is:

1. A method of producing lightweight structure elements as a composite component of at least two elements, wherein one element is a carrier element at which at least one aperture and/or at least one cut-out is/are formed, and at least one further element is a cover plate;

in this respect, a carrier element and at least one cover plate are used which are formed from a glass, a glass ceramic material, a ceramic material and/or silicon having an oxide surface layer which is formed at least in the bonding region of the elements to be connected to one another; and the carrier element has at least a double thickness with respect to the thickness of a cover plate; wherein the surfaces of the cover plate(s) and of the carrier element to be connected to one another in bonding regions are intensely cleaned and are smoothed such that a roughness of the surface is reached there, that they are in direct touching contact with at least 80% of their bonding surfaces with an active compression force on the elements to be bonded together in the range 2 kPa to 1500 kPa exerted using plunger stamp with an elastically deformable element inserted between the plunger or stamp and the elements to be bonded together; and in this respect a thermal treatment is carried out at a temperature of at least 100° C. and a maximum of 600° C. and a maintaining of the temperature over a period of at least 0.5 h to establish a bond connection of the cover plate(s) and the carrier element; wherein at least one cover plate is connected to a surface of the carrier element at which at least one opening of an aperture or of a cut-out is arranged.

2. A method in accordance with claim 1, characterized in that a smoothing of the surfaces is carried out in the bonding region such that a planarity or a deviation of the surface from a desired radius of the carrier element is achieved which is less than a planarity or a deviation at the surface from a desired radius of the cover plate(s) and/or the planarity of the carrier element is increased as the thickness of the respective cover plate increases.

3. A method in accordance with claim 1, characterized in that a smoothing of the surfaces is carried out in the bonding region such that a planarity or a deviation of the surface from bonding surfaces with a peak-to-valley value (PV) which is determined by the distance between a highest and a lowest point of a surface when this surface is approximated by a compensation plane comprises better than 1 µm PV over a surface having a diameter of 10 mm for the carrier element and/or the cover plate with a thickness >5 mm, comprises better than 10 µm PV over a surface having a diameter of 100 mm for thinner carrier elements and/or cover plates with a thickness <5 mm and/or comprises better than 40 µm over a surface having a diameter of 100 mm for carrier elements and/or cover plates with a thickness <1 mm.

4. A method in accordance with claim 1, characterized in that a cleaning is carried out by alternate rinsing with aqueous $NH_4OH$ solution and $H_2O_2$ solution having respective concentrations in the range 2% to 4%, by subsequent rinsing in distilled or deionized water with a simultaneous effect of sound waves in the megahertz range and a subsequent drying.

5. A method in accordance with claim 1, characterized in that subsequent to a cleaning, a plasma treatment with oxygen, nitrogen, a noble gas or a gas mixture thereof, is carried out at pressures in the range 0.01 mbar to 100 mbar over a period of at least 10 s.

6. A method in accordance with claim 5, characterized in that subsequent to the plasma treatment a rinsing is carried out in distilled or deionized water under the simultaneous influence of sound waves in the megahertz range and a subsequent drying.

7. A method in accordance with claim 1, characterized in that the bonding is carried out at a temperature of at least 200° C. and a compression force is exerted on the elements to be bonded together in the range 300 kPa to 700 kPa during the bonding.

8. A method in accordance with claim 1, characterized in that the bonding is carried out at an environmental pressure in the range smaller than 10 mbar and/or of an active compression force in the range 2 kPa to 5 MPa.

9. A method in accordance with claim 1, characterized in that elements connected to one another are produced from a material which is selected from silicon dioxide, a glass or a glass ceramic material having a thermal coefficient of expansion $<1*10^{-6}/K$ in the temperature range between 50 K and 100 K or at room temperature, a ceramic material which is selected from $Al_2O_3$/sapphire, AlN, SiC, $Y_3Al_5O_{12}$, $YVO_4$, other garnets as well as vandates and non-linear optical crystals.

10. A method in accordance with claim 1, characterized in that at least one cover plate having at least one optically effective surface structure is connected to the carrier element and/or at least one optical element is connected to at least one cover plate.

11. A method in accordance with claim 1, characterized in that a surface of a cover plate facing in the direction of the carrier element is provided at least in regions with an electrically conductive coating and an electrically conductive connection to the coating is formed for the production of an electrostatic holding electrostatic chuck element.

12. A method in accordance with claim 1, characterized in that level or planar surfaces, or surfaces spherically arched in a complementary manner, of a cover plate and of a carrier element are connected to one another.

13. A method in accordance with claim 1, characterized in that an optical grid is produced with straight-line cut-outs formed in the carrier element and/or in the cover plate.

14. A method in accordance with claim 1, characterized in that, with mutually connected optically transparent elements, a transmission of at least 60% is observed in the wavelength range between 110 nm and 11 µm, and the transmission is reduced by a maximum of 5% using the produced bonding connection(s).

* * * * *